United States Patent Office 3,629,317
Patented Dec. 21, 1971

3,629,317
PROCESS FOR MANUFACTURING ACRYLONITRILE FROM PROPYLENE
Keisho Yamada, Shigeki Nagai, Kyoji Odan, and Mikio Hidaka, Ube-shi, Japan, assignors to Ube Industries, Ltd., Yamaguchi-ken, Japan
No Drawing. Filed Apr. 17, 1969, Ser. No. 817,192
Claims priority, application Japan, Sept. 17, 1968, 43/66,626
Int. Cl. C07c *121/02*
U.S. Cl. 260—465.3     1 Claim

ABSTRACT OF THE DISCLOSURE

In the process of manufacturing acrylonitrile wherein propylene, ammonia and oxygen are contacted with a solid oxidizing catalyst in the vapor phase at a temperature in the range of 400–600° C., the improved method which comprises using as said solid catalyst that which consists essentially of (A) a bismuth antimonate in which the atomic ratio of bismuth to antimony is 1:1,
(B) stannic oxide, and
(C) a bismuth molybdate in which the atomic ratio of bismuth to molybdenum is 2:3;

the weight ratio of said bismuth antimonate to said stannic oxide being in the range of 95:5–60:40, the weight ratio of bismuth antimonate plus stannic oxide to bismuth molybdate being in the range of 95:5–60:40.

---

This invention relates to a process for the manufacture of acrylonitrile from propylene by ammoxidation and, in particular, to a process by which acrylonitrile can be obtained with high selectivity by reacting propylene with ammonia and oxygen in the presence of a catalyst of new composition.

Numerous proposals have been made in the past regarding the method of producing acrylonitrile by the so-called ammoxidation of propylene which involves the vapor phase oxidation of propylene with either oxygen or air in the presence of ammonia. For example, U.S. Pat. 2,904,580 to Idol discloses a method of manufacturing acrylonitrile by the ammoxidation of propylene using a catalyst selected from the group consisting of the bismuth, tin and antimony salts of phosphomolybdic and molybdic acids and bismuth phosphotungstate.

However, by-products such as acetonitrile and cyanic acid are each formed in amounts of about 10% based on the acrylonitrile, the principal product, when the aforesaid catalyst are used inconsequence, not only does the selectivity for acrylonitrile decline, but there is also the drawback that it becomes difficult to obtain acrylonitrile of high purity commercially advantageously by separation and removal of the foregoing by-products from the acrylonitrile.

On the other hand, U.S. Pat. 3,269,957 discloses a catalyst composition consisting of antimony tetroxide admixed with stannic oxide or consisting essentially of antimony, tin and oxygen, which has been stabilized with up to about 2 mol percent of an oxide of bismuth. It is disclosed that this catalyst can be used in the manufacture of acrylonitrile by the ammoxidation of propylene. Granting that this catalyst is satisfactory with respect to its prolongation of catalytic life, it has the shortcoming that, as in the case with the previously described catalyst, its selectivity for acrylonitrile is low.

Thus, as indicated, the catalysts that have been used heretofore in the manufacture of acrylonitrile by the ammoxidation of propylene are generally low in their selectivity for acrylonitrile and hence are not yet satisfactory from the standpoint of the commercial manufacture of acrylonitrile.

We found that in the case of a catalyst which was obtained by especially choosing a bismuth antimonate in which the atomic ratio of bismuth to antimony is about 1:1 and combining this with stannic oxide and a bismuth molybdate in which the atomic ratio of bismuth to molybdenum is about 2:3, the by-products formed during the ammoxidation of propylene, such as acetonitrile, propionitrile, cyanic acid, acrolein, carbon monoxide and carbon dioxide were controlled to very minute amounts and acrylonitrile was obtained at a high selectivity.

According to the present invention, in the process of manufacturing acrylonitrile by contacting propylene, ammonia and oxygen with a solid oxidizing catalyst in the vapor phase at a temperature of 400–600° C., a method is provided which is characterized in that said oxidizing catalyst consists essentially of (A) a bismuth antimonate in which the atomic ratio of bismuth to antimony is 1:1,
(B) stannic oxide, and
(C) a bismuth molybdate in which the atomic ratio of bismuth to molybdenum is 2:3; and wherein the weight ratio of bismuth antimonate to stannic oxide is in the range of 95:5–60:40 and the weight ratio of bismuth antimonate plus stannic oxide to bismuth molybdate is in the range of 95:5–60:40.

The bismuth antimonate, the first component (A) of the present invention, as indicated by its formula $BiSbO_4$, is a compound in which the atomic ratio of bismuth to antimony is substantially equal to 1. As antimonates of bismuth there also exist compounds other than the compound of the formula $BiSbO_4$ depending upon the atomic ratio of bismuth to antimony, i.e., compounds having the formulas $Bi(SbO_3)_3$ and $(BiO)_3SbO_4$ are also known. However, the use of such antimonates of bismuth without the scope of the present invention will not bring about the high selectivity for acrylonitrile such as shown by the invention catalyst. Needless to say, the presence as ineffective components in the first component of the invention catalyst of such compounds of the foregoing formulas $Bi(SbO_3)_3$ and $(BiO)_3SbO_4$, in a slight amount, say, less than about 10% by weight based on the $BiSbO_4$ is of no interference at all.

The second component (B) of the invention catalyst is stannic oxide ($SnO_2$). When any of the catalyst components of the present invention is used alone, the selectivity for acrylonitrile from propylene is exceedingly low, but when the aforesaid three components are combined in a specific weight ratio, a high selectivity for acrylonitrile of as high even 80–90% is obtained. Hence, from this standpoint, the weight ratio of bismuth antimonate (A) to stannic oxide (B) should preferably be in the range of 95.5–60:40, and particularly 90:10–70:30.

The third component (C) of the invention catalyst is bismuth molybdate in which the atomic ratio of bismuth to molybdenum is about 2:3, i.e. the compound of the formula $Bi_2(MoO_4)_3$. There exists in the case the molybdates of bismuth compounds other than the compound of the formula $Bi_2(MoO_4)_3$ depending upon the atomic ratio of bismuth to molybdenum, i.e., compounds of the formulas $Bi_2MoO_6$ and $Bi_6MoO_{12}$ are also known. However, the use as the third component of the invention catalyst of a bismuth molybdate without the scope of the present invention does not conduce to the achievement of a high selectivity for acrylonitrile as demonstrated by the combination catalyst of the present invention. Needless to say, there is no particular harm done even though there are present as ineffective components in a slight amount, say, less than about 20% by weight based on the $Bi_2(MoO_4)_3$ of the foregoing bismuth molybdates having the formulas $Bi_2MoO_6$ or $Bi_6MoO_{12}$.

The proportion in which the sum total of the bismuth antimonate (A) and stannic oxide (B) is contained to the bismuth molybdate (C) is preferably in a weight ratio range of $A+B:C=95:5-50:50$, and particularly a range of 90:10–60:40.

The invention catalyst can be prepared by the following method. When antimony trichloride is dissolved in concentrated hydrochloric acid and water is then added, hydrolysis takes place to form a precipitate. By the further addition of ammonia water, conversion to antimony trioxide takes place. When a nitric acid solution of bismuth nitrate is added to this antimony trioxide such that the atomic ratio of bismuth to antimony becomes 1:1 and thereafter the mixture is evaporated to dryness until the evolution of nitrogen dioxide ceases followed by calcination, bismuth antimonate is obtained. The calcination is preferably carried out at a temperature usually of 300–700° C., and particularly 540–600° C., for 5–30 hours, and particularly 5–20 hours. A temperature higher than those indicated is not desirable, since the specific surface area of the catalyst declines to result in a decline in the activity of the catalyst.

Stannic oxide, the second component of the catalyst to be used in this invention, may be that which has been prepared by the customary method, and it may contain stannous oxide. Again, the commercially available product can also be used as obtained.

On the other hand, the bismuth molybdate, the third component of the catalyst to be used in the invention process, can be prepared, for example, in the following manner. A nitric acid solution of bismuth nitrate is added to an aqueous solution of ammonium molybdate such that the atomic ratio of bismuth to molybdenum becomes 2:3 followed by evaporation to dryness until the evolution of nitrogen dioxide ceases and thereafter calcination of the dried product, whereupon is obtained bismuth molybdate. The calcination of bismuth molybdate is preferably carried out at a temperature usually 300–650° C., and particularly 500–600° C., for 5–30 hours, and particularly 5–20 hours. Temperatures higher than the foregoing range are undesirable, since at such temperatures bismuth molybdate melts.

The bismuth antimonate and the bismuth molybdate, which have been obtained as hereinabove described, are prepared in customary manner into the catalyst, using, say a pulverizer to knead the components into paste form with water, following which the paste is molded and dried.

The so obtained catalyst may be used supported on a carrier. As carriers, those which bring about desirable results for the reaction can be used, such, for example, as silica, alumina, alumina-silica, silicates and carborundum, which have been inactivated by treatment at elevated temperatures. These can be added to the catalyst in optional amounts, for example, in a range of 10–90% based on the overall weight.

The invention catalyst will vary depending upon the manner of combination of the components and their conditions of preparation but, generally speaking, they possess specific surface areas of 1–3 m.²/g.

There is no particular restriction as the size of the catalyst particles, the particle size being suitably chosen in accordance with the conditions of use. Further, it is possible to provide the catalyst with adequate mechanical strength by molding it into pellet or granular form by means of the usually employed techniques of molding catalysts. The activity of the catalyst is not affected by the type of the molding method employed.

According to the invention process, except that the hereinbefore described catalyst is used, the ammoxidation of propylene can otherwise be carried out in accordance with the processing conditions which per se are known.

While the propylene used need not necessarily be one whose purity is high, it is best to avoid so far as possible the copresence of such gases, for example, as isobutylene and acetylenes, which are substantially active under the conditions of the reaction.

The oxygen to be catalytically reacted with the propylene may be pure oxygen gas, but since this need not be of high purity, air may be used instead.

The proportion in which the oxygen is fed to the propylene is suitably in a range of 0.8–3.0-fold molar quantity, and preferably 1.0–2.0-fold molar quantity, of the propylene.

On the other hand, the proportion in which the ammonia is fed to the propylene is suitably in a range of 0.5–3.0-fold molar quantity, and preferably 0.8–1.2-fold molars quantity, of the propylene.

Aside from the propylene, oxygen and ammonia, the use of a diluent gas is also an advantage. As diluent gases, those which are substantially inactive to this reaction, such, for example, as steam, nitrogen, carbon dioxide, ethane, propane, and butane can be used. A diluent gas of this sort can be used in an amount exceeding 0.5-fold molar quantity of the propylene. Of the diluent gases, steam particularly has not only the action of enhancing the selectivity for the intended acrylonitrile but also the action of prolonging the catalytic activity.

A reaction temperature of 400–600° C. is used, and a temperature of 400–500° C. is especially to be preferred. A contact time of 0.5–40 seconds, and particularly 2–20 seconds, is preferred. On the other hand, as the reaction pressure, atmospheric pressure will do. However, it is also possible to conduct the reaction with an application of a low degree of pressure or under reduced pressure.

Although the invention process can be readily carried out by employing the per se known vapor phase reaction apparatus which use the catalyst as a fixedly moving or fluidized bed, the use of a reaction apparatus of the fixed bed type is of particular advantage from the standpoint of the life of the catalyst.

The recovery of the intended acrylonitrile from the reaction product can be accomplished in the following manner. The effluent gas from the reaction apparatus is contacted with either cold water or other solvents of acrylonitrile to extract the acrylonitrile, following which this is submitted to fractional distillation. It is, of course, possible to treat the effluent gas with an aqueous acid solution, say, aqueous sulfuric acid solution for neutralizing the excess ammonia prior to extraction of the acrylonitrile. According to the invention process, acrylonitrile can be obtained from propylene at a very high selectivity. In addition, the formation of by-products such as acetonitrile, propionitrile, cyanic acid, acrolein, carbon monoxide and carbon dioxide is small. Hence, the purification step can be made much more simple than that of the conventional methods, and furthermore acrylonitrile of high purity can be provided at low cost.

For a better understanding of the invention, the following examples and comparisons are given.

EXAMPLE 1

The catalyst was prepared in the following manner.

577 grams of antimony trichloride was dissolved by adding 59.7 cc. of hydrochloric acid, after which water was added to effect hydrolysis and formation of a precipitate. 380 cc. of ammonia water was then added to convert the precipitate into antimony trioxide which was separated by filtration and water-washed.

This antimony trioxide was placed in an evaporating dish, to which was then added a solution of 1,227 grams of bismuth nitrate in 229 cc. of nitric acid of 62% concentration, following which this mixture was evaporated to dryness until the evolution of nitrogen oxide ceased. The solid substance obtained by drying was packed into a U-shaped stainless steel pipe, and the calcination of the substance was carried out for 16 hours at 500° C. by heating the pipe from the outside while flowing air through at the rate of 100 cc. per minute. Bismuth antimonate (BiSbO$_4$) was obtained in this manner.

Two hundred grams of stannic oxide was intimately mixed with the so obtained bismuth antimonate, and a mixture in which the weight ratio of bismuth antimonate to stannic oxide was 80:20 was obtained. This mixture is hereinafter designated "A."

On the other hand, a solution consisting of 1080 grams of bismuth nitrate, 200 cc. of 62% nitric acid and 200 cc. of water was added to a solution consisting of 590 grams of ammonium molybdate and 1000 cc. of water. This mixture was then placed in an evaporating dish and evaporated to dryness until the evolution of nitrogen dioxide ceased. The thus dried solid substance was packed into a U-shaped stainless steel pipe and calcined for 16 hours at 500° C. by heating the pipe from the outside while flowing air at the rate of 100 cc. per minute. Bismuth molybdate [Bi$_2$(MoO$_4$)$_3$] was obtained in this manner.

The so obtained bismuth molybdate was intimately mixed with the previously described mixture A such that the weight ratio of A to bismuth molybdate would become 75:25, after which the mixture was kneaded into paste form with water using a pulverizer. This pasty mixture as then dried for 16 hours at 130° C., and thereafter screened to 14–20 mesh (Tyler standard sieve), and this was used as the catalyst.

Next, the ammoxidation of propylene was carried out in the following manner.

Fifteen cc. of the foregoing catalyst was packed into a U-shaped stainless steel reaction tube having an inside diameter of 16 mm., and the catalytic reaction was carried out at a temperature of 470° C. by flowing therethrough at the rate of 80 cc. per minute a gas mixture of propylene, ammonia, steam and air in a mole ratio of 1:1:1:7.

The contact time was 11.25 seconds.

The conversion of propylene was 59.3% and the selectivity for the several reaction products was as follows:

| | Percent |
|---|---|
| Acrylonitrile | 90.6 |
| Acetonitrile | 3.0 |
| Cyanic acid | 1.2 |
| Acrolein | 1.0 |
| Propionitrile | 0.2 |

The formation of acetone was not noted.

Comparison 1

The experiment was carried out as in Example 1, except that bismuth antimonate (BiSbO$_4$) screened to 14–20 mesh was used alone in an amount of 15 cc. The conversion of the propylene was 25.5% and the selectivity for acrylonitrile was 10.9%. The formation of acetonitrile, cyanic acid, acrolein and propionitrile was in trace amounts.

Comparison 2

The experiment was carried out as in Example 1, except that stannic oxide screeed to 14–20 mesh was used alone. The conversion of propylene was 40.2% and the selectivity for acrylonitrile was 10.3%.

Examples 2–6 and Comparisons 3–5

The ammoxidation of propylene was carried out under identical conditions as in Example 1, except that the weight ratio of the aforesaid mixture A and bismuth molybdate [Bi$_2$(MoO$_4$)$_3$] in the catalyst was varied.

The results obtained are shown in Table I.

TABLE I

| Experiment | Catalyst (wt. ratio) A | Catalyst (wt. ratio) Bi$_2$(MoO$_4$)$_3$ | Conversion of propylene (percent) | Reaction product selectivity (percent) Acrylonitrile | Acetonitrile | Cyanic acid | Acrolein |
|---|---|---|---|---|---|---|---|
| Example: | | | | | | | |
| 2[1] | 90 | 10 | 53.5 | 82.6 | 3.7 | 0.4 | 1.9 |
| 3[1] | 85 | 15 | 55.7 | 91.9 | 3.4 | 1.2 | 1.3 |
| 4[1] | 80 | 20 | 58.4 | 92.0 | 2.5 | 1.1 | 1.4 |
| 5[1] | 70 | 30 | 63.2 | 87.2 | 1.6 | 1.2 | 0.5 |
| 6[1] | 65 | 35 | 66.1 | 86.7 | 3.7 | 2.4 | 1.5 |
| Comparison: | | | | | | | |
| 3 | 50 | 50 | 69.4 | 74.3 | 5.6 | 3.6 | 2.5 |
| 4 | 100 | | 50.5 | 80.6 | 6.5 | 0.4 | 1.9 |
| 5 | | 100 | 52.7 | 56.5 | 7.4 | 5.6 | 1.3 |

[1] The formation of acetone was not noted. Further, the formation of propionitrile was of a trace order.

Examples 7–8 and Comparisons 6 and 7

The ammoxidation of propylene was carried out as in Example 1 except that the composition of the catalysts was varied as indicated in Table II, below, with the results as shown therein.

TABLE II

| Experiment | Catalyst composition (wt. percent) Bi$_4$SbO | SnO$_2$ | Bi$^2$(MoO$_4$)$_3$ | Conversion of propylene (percent) | Reaction product selectivity (percent) Acrylonitrile | Acetonitrile | Cyanic acid | Acrolein |
|---|---|---|---|---|---|---|---|---|
| Example: | | | | | | | | |
| 7 | 72 | 8 | 20 | 50.2 | 90.7 | 2.6 | 1.2 | 1.5 |
| 8 | 56 | 24 | 20 | 62.4 | 87.5 | 3.1 | 1.0 | 1.3 |
| Comparison: | | | | | | | | |
| 6 | 90 | 10 | | 42.6 | 79.5 | 4.2 | 1.2 | 2.3 |
| 7 | 70 | 30 | | 55.3 | 75.6 | 3.5 | 1.5 | 1.0 |

When the foregoing working examples and comparisons are considered, it is apparent that for holding the formation of such by-products as acetonitrile, cyanic acid, acrolein and propionitrile to a very small amount and obtaining the intended acrylonitrile at a high selectivity of 80–90% it is very important that a bismuth antimonate in which the atomic ratio of bismuth to antimony is 1:1, stannic oxide, and a bismuth molybdate in which the atomic ratio of bismuth to molybdenum is 2:3 must be combined in a specified proportion as hereinbefore indicated.

This high selectivity for acrylonitrile of the invention catalyst does not substantially change even when the conversion of the propylene is raised, say, to as high as 90%.

We claim:

1. In a process for the production of acrylonitrile comprising contacting propylene, ammonia and oxygen with a solid oxidation catalyst in the vapor phase at a temperature of from 400–500° C., the improvement wherein said solid oxidation catalyst consists essentially of (A) bismuth antimonate of the formula $$BiSbO_4$$

(B) stannic oxide of the formula $$SnO_2$$

and (C) bismuth molybdate of the formula $$Bi_2(MoO_4)_3$$

the weight ratio of said bismuth antimonate to said stannic oxide being from 95:5 to 60:40, the weight ratio of said bismuth antimonate plus said stannic oxide to said bismuth molybdate being from 95:5 to 60:40.

References Cited

UNITED STATES PATENTS 3,269,957    8/1966    Bethell _____ 260—465.3

JOSEPH PAUL BRUST, Primary Examiner

U.S. Cl. X.R.

252—456, 469; 260—604 R